(No Model.) 3 Sheets—Sheet 1.

O. M. BLOOD.
GATE.

No. 552,683. Patented Jan. 7, 1896.

WITNESSES:
John A. Rennie
J. H. Baplinger

INVENTOR
O. M. Blood
BY
Munn & Co
ATTORNEYS.

(No Model.) 3 Sheets—Sheet 2.

O. M. BLOOD.
GATE.

No. 552,683. Patented Jan. 7, 1896.

WITNESSES:
John A. Rennie
N. P. Hutchinson

INVENTOR
O. M. Blood
BY
Attorneys.

(No Model.)
O. M. BLOOD.
GATE.
No. 552,683.
3 Sheets—Sheet 3.
Patented Jan. 7, 1896.
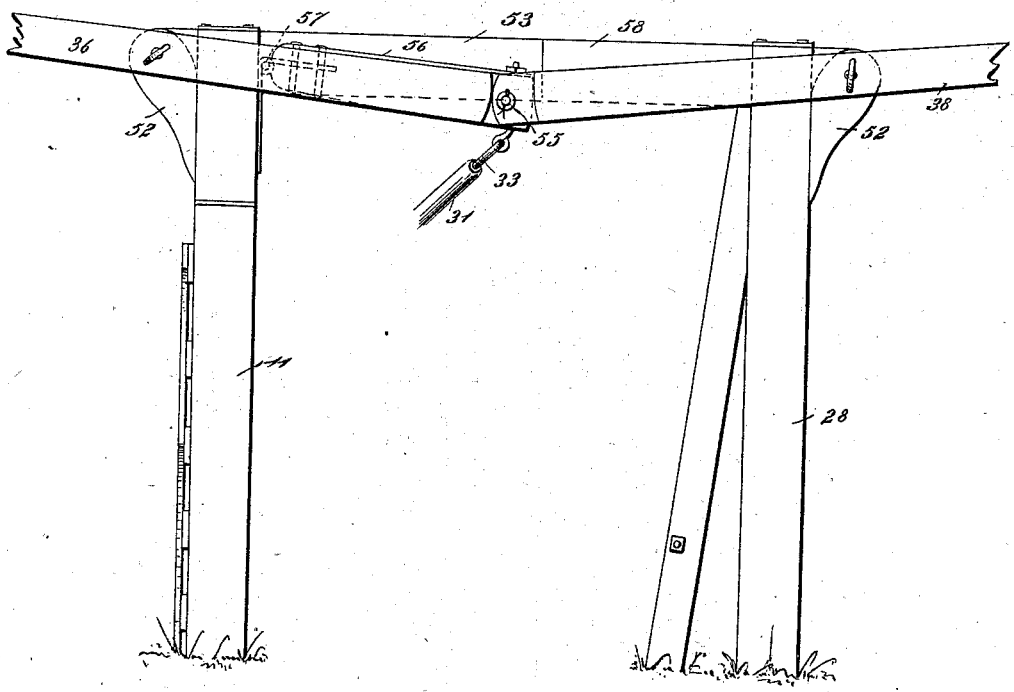
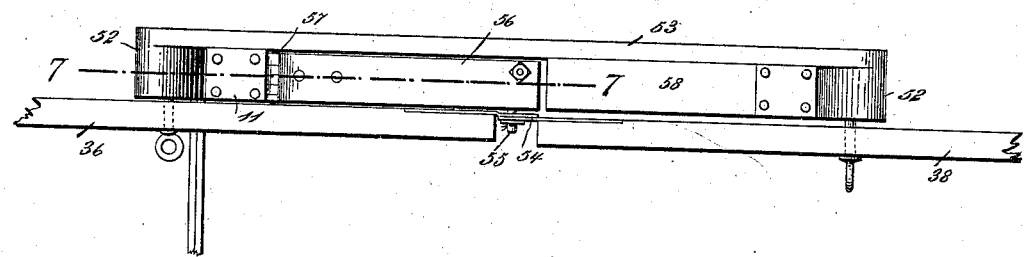
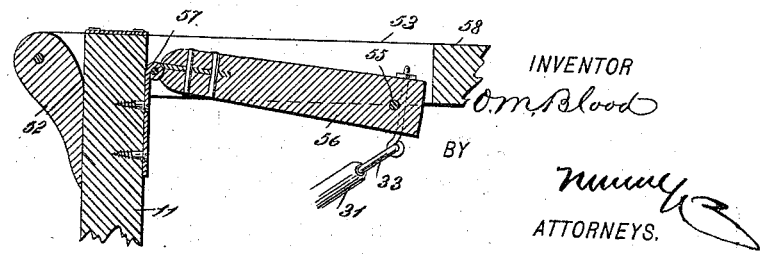
WITNESSES:
INVENTOR
ATTORNEYS.

UNITED STATES PATENT OFFICE.

ORVILLE MEAD BLOOD, OF ELBURN, ILLINOIS.

GATE.

SPECIFICATION forming part of Letters Patent No. 552,683, dated January 7, 1896.

Application filed November 10, 1894. Serial No. 528,398. (No model.)

*To all whom it may concern:*

Be it known that I, ORVILLE MEAD BLOOD, of Elburn, in the county of Kane and State of Illinois, have invented a new and Improved Gate, of which the following is a full, clear, and exact description.

My invention relates to improvements in gates and particularly to farm-gates; and the object of my invention is to produce a very simple, comparatively cheap and strong gate, and also provide working mechanism for the gate which is simple in operation, is not likely to get out of repair, and may be operated from either side of the gate by a person in a carriage or on horseback so as to open or close the gate.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
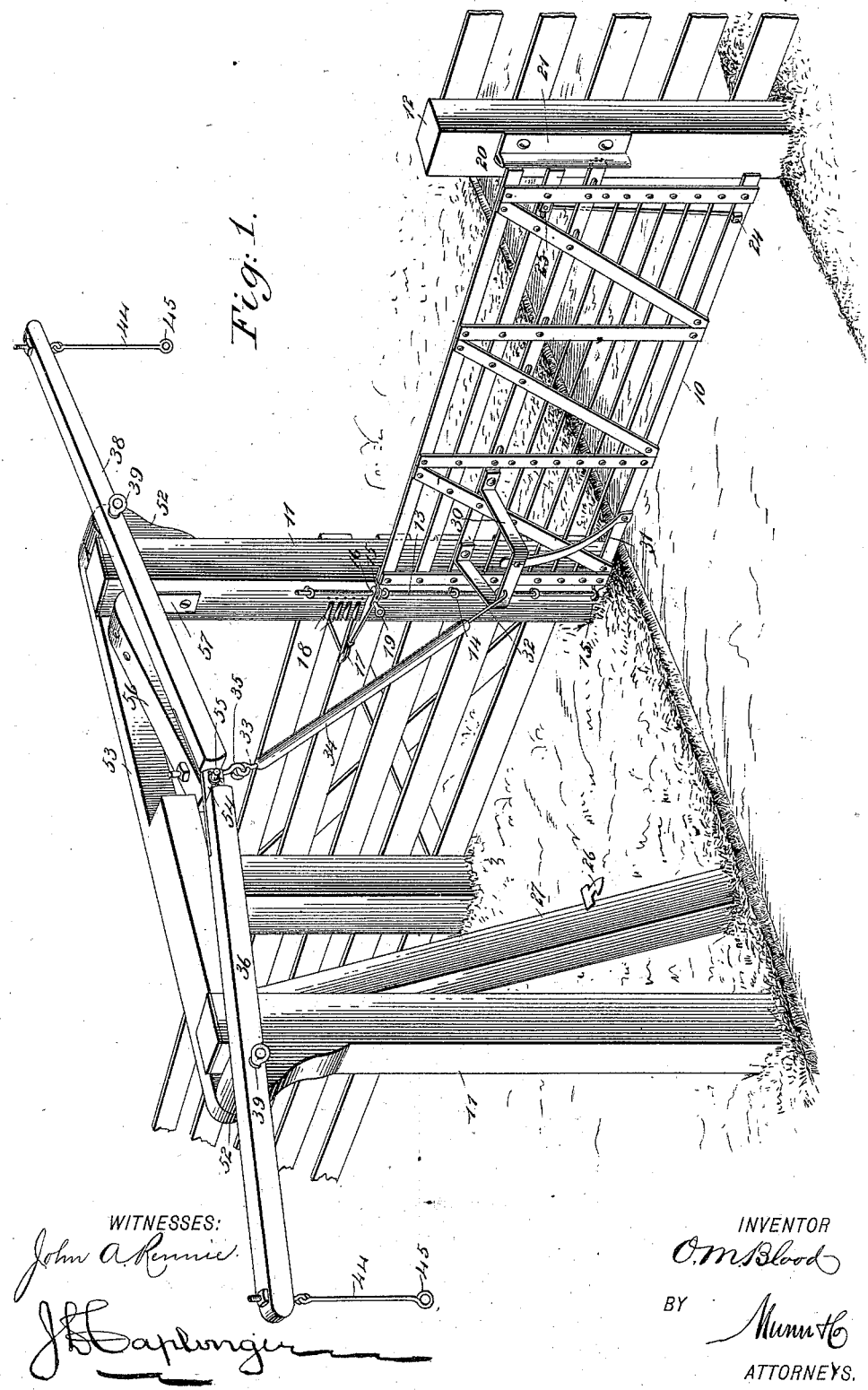
Figure 2:
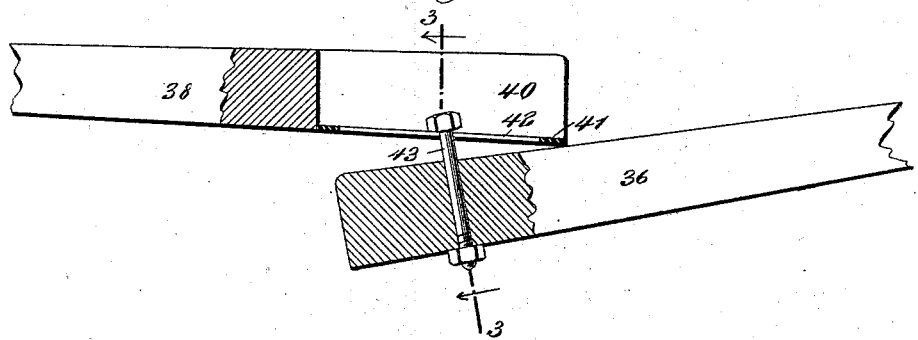
Figure 3:
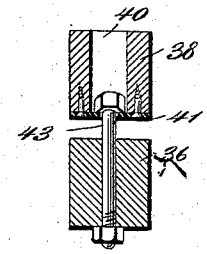
Figure 4:
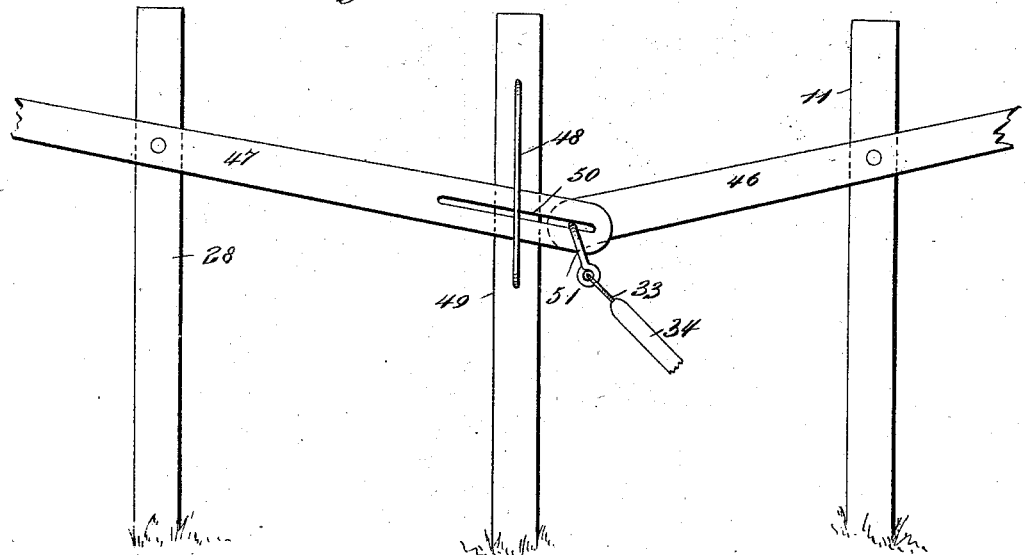

Figure 1 is a perspective view of my improved gate and the working mechanism therefor. Fig. 2 is a broken sectional elevation of a modified arrangement of the gate-working levers and the connection between them. Fig. 3 is a cross-section on the line 3 3 of Fig. 2. Fig. 4 is a broken detail elevation of a modified arrangement of the levers for working the gate. Fig. 5 is a broken side elevation of the preferred form of lever mechanism for working the gate. Fig. 6 is a plan view of the construction shown in Fig. 5, and Fig. 7 is a broken vertical section on the line 7 7 of Fig. 6.

The gate 10 may be of any usual construction, as the gate itself does not constitute the invention but only the attachments in connection with it and the means for hanging it. The gate is hung between posts 11 and 12, the former being provided with a vertical hinge-rod 13, which forms the pintle of the gate-hinges and is held to the post 11 by suitable eyebolts 14, and the gate has at its upper and lower corners projecting ears 15, which slide and turn on the rod 13. The upper ear 15 of the gate is held in the forked end 16 of the hinge-bar 17, which is adapted to lie in either of the slots 18 in the post 11, and which is held in place by a set-screw 19. This arrangement of the hinge-bar enables the height of the gate to be easily regulated, so that if desired the gate may be raised sufficiently to clear any obstruction or to permit small animals or fowls to pass beneath it.

At its free end the gate swings against the inclined face 20 of the keeper-plate 21, which is secured to the post 12, and the gate is provided with a slide-bar 22, which has a limited longitudinal movement and is adapted to slip behind the inclined face of the keeper-plate, as shown in Fig. 1, so as to hold the gate closed. The slide-bar 22 may be held in any convenient way and to it is secured a vertical latch-bar 23, which is pivoted at its lower end, as shown at 24, and at its upper end has a sliding connection with one of the gate-rails, as shown at 25 in Fig. 1.

The latch-bar 23 is adapted to engage a catch 26 when the gate is open and so hold the gate open, and the catch is fastened to the brace 27 of the post 28, which is arranged in alignment with the post 11, so that when the gate is thrown open and fastened it will be at right angles to its position when closed. The catch 26 may be placed on any convenient support, however. The post 28 is connected with the post 11 by a suitable cross-brace 29.

The slide-bar 22 of the gate is moved backward and forward, as described presently, and to enable it to be conveniently moved it is provided with a bracket 30, and this is braced by a brace 31, which is at its lower end pivoted to the lower rail of the gate and at its upper end pivoted to the inner side of the bracket, as shown clearly in Fig. 1. The bracket 30 is connected with the operating-levers by a pull-rod, which comprises the rod 32 hooked to the bracket, the rod 33 connected to the levers, and the turnbuckle 34 connecting the two rods 32 and 33 so as to provide for regulating the length of the pull-rod. The rod 33 connects with an eyebolt 35 on the under side of a tilting hinge-block 56 pivoted by means of a hinge 57, as clearly seen in Figs. 5, 6, and 7, which are detail views of this part of the device, to one inner side of the gate-post 11 near the upper end thereof, and said block stands normally at an angle to said post, being arranged to play, when moved on its pivot, in a recess formed in one side of a T-bar 53 connecting the upper part of post 11 with a similar post 11ª arranged at right angles to the gate 10 when in its closed position.

On the outer side of the free end of the hinge-block 56 is secured a projecting stud or pin 55, which projects through overlapping and correspondingly slotted plates 54 secured to the adjacent ends of gate-operating levers 36 and 38 pivoted on pins 39 on the upper ends of the respective posts 11ª and 11 and adapted to tilt vertically, being arranged to project outward at right angles to and on opposite sides of the gate when the same is closed, said levers being long enough and being arranged at such a height as to enable a person in a carriage or wagon to operate the gate conveniently, and being provided with pull-rods 44, pivoted to their ends and provided with eyes or other devices 45 at their lower extremities to enable the same to be conveniently grasped by the hand of the operator.

The operation of the gate and mechanism is as follows: When the gate is to be opened, the operator pulls down on either of the pull-rods 44 and thus raises the inner ends of the levers 36 and 38, which are moved or tilted upward together with the hinge-block 56, which being connected to the pull-rod communicates its movement thereto in such a way as to move the slide-bar 22 longitudinally to disengage the end thereof from the keeper-plate 21 and at the same time to pull the gate open, and the inertia of the gate causes it to swing sufficiently far for the weight of the levers and connections acting on the outer portion of the bracket 30 to swing the gate completely open, and as it does so the latch-bar 23 engages the catch 26 and the gate swings against the brace 27, which serves as an abutment for the gate. When the gate has swung to this position the bracket 30 is behind the center of the levers 36 and 38, so that by pulling again on one of the rods 44 and tilting the levers the gate is closed, the pull-rod first tripping the slide-bar 22 and latch-bar 23 so as to release the latch-bar, and then swinging the gate far enough for the weight of the levers, when released, to effect its closure, and as it closes the slide-bar 22 again engages the keeper-plate.

In Figs. 2 and 3 I have shown a modified arrangement of the inner ends of the tilting gate-operating levers, wherein the hinge-block 56 is dispensed with, the inner end of the lever 38 being provided with a recess or slot 40, extending vertically through it and covered at its lower side by a metal plate 41, having a longitudinal slot 42 made to correspond with said recess 40. The adjacent end of the lever 36 is coupled to the pull-rod and is provided with a bolt or pin 43, extending through the slot 42 and provided with a head at its extremity.

In Fig. 4 I have shown still another modified arrangement wherein the tilting levers 46 and 47 are fulcrumed on the posts 11 and 28 like the levers 36 and 38 already described, and the inner end of the lever 47 moving in a keeper 48 which is attached to a guide-post 49. The lever 46 has secured to it a bent connecting-rod 51, which extends through a slot 50 in the lever 47 and engages the rod 33 of the pull-rod, and thus a sliding connection is made between the two levers 46 and 47, so that both are tilted in unison and the working of either operates the gate, as described.

Having thus described my invention, I claim as new and desire to secure by Letters Patent—

1. The combination, with the post having a series of transverse slots or recesses therein, the hinge rod thereon and the gate having ears held on the hinge rod, of the hinge bar connected with one of the gate ears and adapted to lie in the slots of the gate post, substantially as described.

2. The combination of the gate posts, a swinging gate, a slide-bar thereon, a keeper to be engaged by the slide-bar when in one position, a U-shaped bracket secured at its opposite ends to the slide-bar, with its central portion projecting therefrom, a brace pivoted at its lower end to the gate below the slide-bar and at its upper end to the central part of the bracket thereon, the tilting levers arranged at right angles to the closed gate, and a pull-rod connecting the said levers to the bracket on the slide-bar, substantially as set forth.

3. The combination, with the swinging gate, the slide bar on the gate and the keeper to engage the bar, of the bracket on the slide bar, the brace pivoted to the bracket and to the gate, the tilting connecting levers arranged at right angles to the gate when closed, and the adjustable pull rod connecting the levers and bracket, substantially as described.

4. The combination, with the swinging gate, of the posts aligning at right angles to the gate, the hinge block on one of the posts, the free end of the block being connected with the gate, and the tilting levers fulcrumed on the post and pivoted at their meeting ends to the hinge block, substantially as described.

5. The combination, with the gate, of the aligning posts at right angles to the gate, the cross bar connecting the posts, the abutment block on the cross bar, the hinge block swinging opposite the abutment block, an operative connection between the hinge block and the gate, and the tilting levers fulcrumed on the posts and connected to the hinge block, substantially as described.

6. The combination of the posts, a swinging gate, tilting levers fulcrumed on the posts and having overlapping slotted portions, a hinge block also pivoted on one of the posts and having a projection playing in the slots of the respective levers, and a pull-rod connecting said hinge block to the gate, substantially as set forth.

ORVILLE MEAD BLOOD.

Witnesses:
  JENNIE BLOOD,
  NETTIE N. MARVIN.